(12) United States Patent
Takahashi et al.

(10) Patent No.: US 8,978,614 B2
(45) Date of Patent: Mar. 17, 2015

(54) LUBRICATION APPARATUS FOR FOUR-STROKE ENGINE

(71) Applicants: Yuji Takahashi, Aichi (JP); Masaki Kurimoto, Shizuoka (JP)

(72) Inventors: Yuji Takahashi, Aichi (JP); Masaki Kurimoto, Shizuoka (JP)

(73) Assignee: Makita Corporation, Aichi (JP)

( * ) Notice: Subject to any disclaimer, the term of this patent is extended or adjusted under 35 U.S.C. 154(b) by 47 days.

(21) Appl. No.: 13/668,710

(22) Filed: Nov. 5, 2012

(65) Prior Publication Data
US 2013/0139782 A1    Jun. 6, 2013

(30) Foreign Application Priority Data
Dec. 6, 2011 (JP) .................................. 2011-267192

(51) Int. Cl.
  *F01M 11/02* (2006.01)
  *F01M 3/04* (2006.01)
  *F01M 1/04* (2006.01)

(52) U.S. Cl.
  CPC . *F01M 11/02* (2013.01); *F01M 1/04* (2013.01)
  USPC ............. 123/196 R; 123/196 M; 123/196 CP

(58) Field of Classification Search
  CPC ........... F01M 11/02; F01M 1/02; F01M 3/04; F01M 9/10; F01M 3/00; F01M 1/16; F01M 1/04; F02B 2075/027; F02B 2075/025
  USPC ............................. 123/196 R, 196 M, 196 CP
  See application file for complete search history.

(56) References Cited

U.S. PATENT DOCUMENTS

| 2,938,601 | A | 5/1960 | Brafford |
| 6,769,391 | B1 | 8/2004 | Lee et al. |
| 7,131,421 | B2 * | 11/2006 | Hada et al. ................ 123/196 R |
| 7,341,039 | B1 * | 3/2008 | Jaszewski et al. ........ 123/196 R |
| 8,196,710 | B2 * | 6/2012 | Hiramatsu .................... 184/106 |
| 8,695,563 | B2 * | 4/2014 | Sugiyama et al. ....... 123/196 M |
| 2011/0067669 | A1 | 3/2011 | Sugiyama et al. |

FOREIGN PATENT DOCUMENTS

| EP | 2305972 | 4/2011 |
| JP | 63-183456 | 11/1988 |
| JP | 05-50012 | 7/1993 |
| JP | 2007-224824 | 9/2007 |

OTHER PUBLICATIONS

Search report from E.P.O., mail date is Jul. 25, 2014.

* cited by examiner

*Primary Examiner* — Lindsay Low
*Assistant Examiner* — Syed O Hasan
(74) *Attorney, Agent, or Firm* — Greenblum & Bernstein P.L.C.

(57) ABSTRACT

A lubrication apparatus for a four-stroke engine includes an oil tank, a supply passageway having an opening to supply oil mist from the oil tank to driving parts, the opening being provided in the oil tank. A partition is provided between the opening and a side wall of the oil tank, the partition being formed by partition plate members so as to divide an inside of the oil tank into an inner area and an outer area. The inner area includes the opening, and the outer area is defined between the inner area and the side wall. Oil can freely move between the inner area and the outer area, and the opening is placed in a position above a surface of the oil accumulated in the oil tank even when the four-stroke engine is tilted in every direction.

13 Claims, 7 Drawing Sheets

LUBRICATION APPARATUS FOR FOUR-STROKE ENGINE

CROSS-REFERENCES TO RELATED APPLICATIONS

This application claims the benefit of Japanese Patent Application No. 2011-267192, filed on Dec. 6, 2011, the entire contents of which are incorporated herein by reference.

BACKGROUND

1. Technical Field

The present invention relates to a lubrication apparatus for a four-stroke engine.

2. Related Art

In recent years, there is an increased demand for a working machine equipped with a four-stroke engine. Previously, a four-stroke engine was used for only a brush cutter and a backpack working machine, but recently has been widely used for, for example, a pole saw, a pole hedge trimmer, a coffee harvester and so forth. For example, a portable four-stroke engine has been known as disclosed in Japanese Patent Application Laid-Open No. 2007-224824. In general, the part around a crankshaft needs a greater amount of oil than for a valve operating mechanism. Then, conventionally, a lubrication apparatus supplies the oil or oil mist in a crank chamber to a valve operating chamber and a valve operating mechanism, using pressure fluctuation in the crank chamber, without controlling the amount of the oil or oil mist. Therefore, the oil or oil mist is oversupplied to the valve operating chamber to lubricate the valve operating mechanism.

As a result, too much oil remains in the valve operating chamber. This causes a problem that when the engine is used in different positions, oil is discharged in large quantities while blowby gas is discharged to a combustion chamber, so that oil can be consumed fast. Then, oil consumption for a short period of time causes the period of time over which oil is refilled until the next time, to be shortened, and therefore if refilling of oil is neglected, lubrication trouble may occur. In addition, if an amount of oil to be discharged further increases, unburned oil is discharged from a muffler to the outside, and this may cause environmental damage. As described above, a portable four-stroke engine has been used for various purposes, and therefore is tilted in different directions and even shaken violently.

SUMMARY

In view of the above described problem, it is therefore an object of the present invention to provide a lubrication apparatus for a four-stroke engine configured to prevent the oil in the oil tank from surging and also prevent an excessive amount of oil from flowing into the valve operating mechanism, even if the four-stroke engine is tilted in every direction and even shaken violently.

To solve the above-described problem, according to the present invention, a lubrication apparatus for a four-stroke engine includes an oil tank (7); a supply passageway (31) having an opening (31a) to supply oil mist from the oil tank (7) to driving parts, the opening (31a) being formed in the oil tank (7); and a partition (66) provided between the opening (31a) and a side wall (7b) of the oil tank (7), the partition (66) being formed by partition plate members (66a) to divide an inside of the oil tank (7) into an inner area and an outer area, the inner area including the opening (31a), and the outer area being defined between the inner area and the side wall (7b), wherein: oil can freely move between the inner area and the outer area; and the opening (31a) is placed in a position above a surface of the oil accumulated in the oil tank (7) even when the four-stroke engine (1) is tilted in every direction.

Preferably, the partition (66) is placed apart from upper and bottom walls (7a) of the oil tank (7) in a vertical direction of the partition (66), when the four-stroke engine (1) is in an upright position.

Preferably, the partition (66) is placed apart from front and back walls (7a) of the oil tank (7) in a longitudinal direction of the partition (66), when the four-stroke engine (1) is in the upright position.

Preferably, an additional partition plate member (66c) is provided between the inner area and the side wall (7b).

Preferably, an additional partition plate member (66c) is provided between the inner area and the side wall (7b) of the oil tank 7; and the additional partition plate member (66c) is closer to the side wall (7b), and has a smaller distance to each of the top, bottom, front and back walls (7a) of the oil tank 7, than the partition plate members (66a).

Preferably, the opening (31a) is formed such that a distance between the surface of the oil accumulated in the oil tank (7) and the opening (31a) is 3 mm or more.

Preferably, an equation $V1/V0 \geq 0.1$ is satisfied under a condition that: V1 is a volume of the outer area a defined by a plane including a partition plate member (66a) that divides between the inner area including the opening (31a) of the supply passageway (31) and the outer area, upper, lower, front and back walls (7a) and the side wall (7b); and V0 is a prescribed amount of the oil accumulated in the oil tank (7).

Preferably, an equation $V11/V0 \geq 0.1$ is satisfied under a condition that: an additional partition plate member (66c) is provided between a partition plate member (66a) and the side wall (7b); V11 is a volume of the outer area al defined by a plane including the additional partition plate member (66c), upper, lower, front and back walls (7a) and the side wall (7b); and V0 is a prescribed amount of the oil A accumulated in the oil tank 7.

Preferably, an equation $S \times V1/V0 \geq 0.3$ mm is satisfied under a condition that: S is a distance between the opening 31a and a partition plate member (66a) that divides between the inner area including the opening (31a) of the supply passageway (31) and the outer area; V1 is a volume of the outer area a defined by a plane including the partition plate member (66a), upper, lower, front and back walls (7a) and the side wall (7b); and V0 is a prescribed amount of the oil accumulated in the oil tank (7).

Preferably, an equation $V2/V \geq 0.1$ is satisfied under a condition that: V2 is a volume of the inner area of the oil tank (7), and V is an internal volume of the oil tank (7).

Preferably, an equation $S1 \times V11/V0 \geq 0.3$ mm is satisfied under a condition that: an additional partition plate member (66c) is provided between a partition plate member (66a) and the side wall (7b); S1 is a distance between the opening (31a) and the additional partition plate member (66c); V11 is a volume of the outer area al defined by a plane including the additional partition plate member (66c), upper, lower, front and back walls (7a) and the side wall (7b); and V0 is a prescribed amount of the oil accumulated in the oil tank (7).

With the present invention, it is possible to provide a lubrication apparatus for a four-stroke engine configured to prevent the oil in the oil tank from surging; prevent an excessive amount of oil from being supplied to the valve operating mechanism; and prevent an excessive amount of oil from being consumed, when the four-stroke engine is not only in the upright position but also tilted in every direction and even shaken violently.

DESCRIPTION OF EXEMPLARY EMBODIMENTS

Hereinafter, a lubrication apparatus for a four-stroke engine according to an embodiment of the present invention will be explained with reference to FIGS. 1 to 7. The lubrication apparatus is designed to be mounted in a four-stroke engine, and therefore a four-stroke engine including this lubrication apparatus will be explained with reference to FIG. 1. Basically, the four-stroke engine according to the present embodiment is used in the upright position where the axis line of a cylinder is in the vertical direction and the cylinder is turned to the top. Now, the structure of the four-stroke engine will be explained on the basis that the four-stroke engine is in the upright position. Here, FIG. 1 shows the four-stroke engine when a piston is located in the top dead center.

Figure 1:
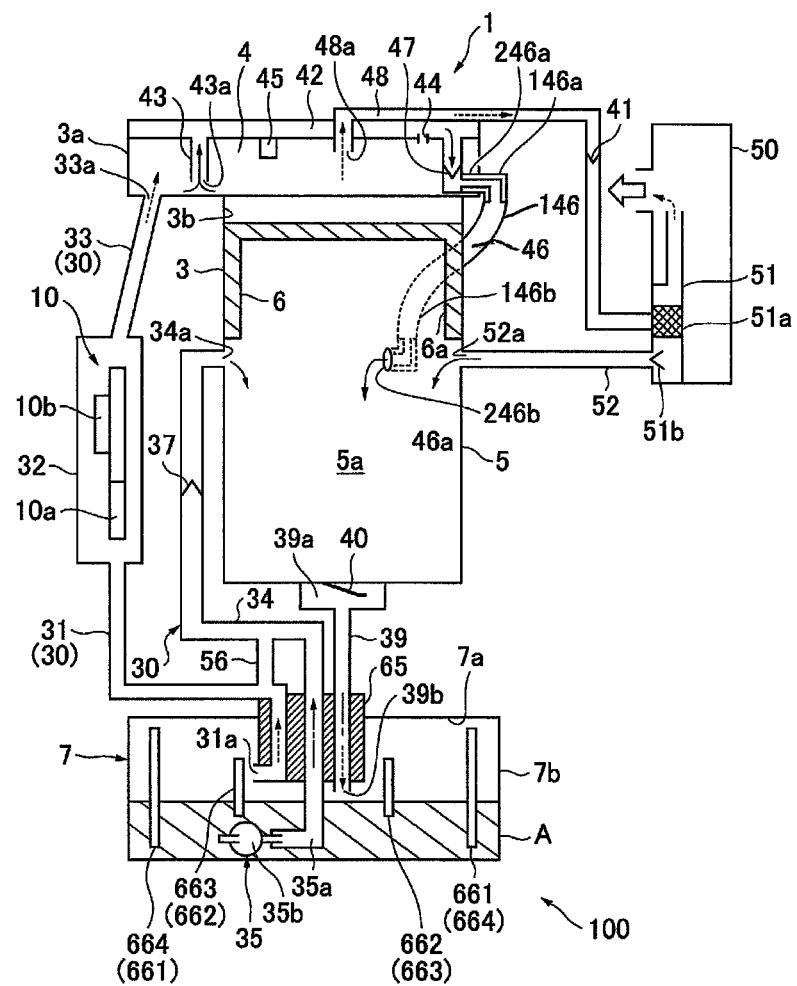
FIG. 1 is a schematic view showing a four-stroke engine equipped with a lubrication apparatus according to the present invention.

As shown in FIG. 1, a four-stroke engine 1 includes: a cylinder block 3 formed integrally with a cylinder head 3a; a crankcase 5 which is mounted to the lower part of the cylinder block 3 and constitutes a crank chamber 5a; and an oil tank 7 provided below the crankcase 5. The oil tank 7 is provided separately from the crankcase 5 and accumulates lubricating oil (hereinafter referred to as "oil A") in a prescribed amount to normally drive the engine.

A crankshaft (not shown) is rotatably supported in the connecting portion between the cylinder block 3 and the crankcase 5. A piston 6 is connected to the crankshaft via a counterweight and a connecting rod and so forth coupled with the counterweight. The piston 6 is slidably inserted in the cylinder 3b in the cylinder block 3.

An intake port and an exhaust port are provided on the upper wall of the cylinder 3b in the cylinder block 3. The intake port and the exhaust port communicate with a carburetor (not shown) and an exhaust muffler (not shown), respectively, and have an intake valve and an exhaust valve to open and close the respective ports. Here, the four-stroke engine 1 according to the present embodiment may be carried by the user in use. In this case, the four-stroke engine 1 may turn upside down on a temporary basis in use.

A valve operating mechanism 10 drives the above-described valves and includes parts such as a valve driving gear 10a firmly fixed to the crankshaft, a cam gear 10b driven by the valve driving gear 10a, to which a cam is connected, and a rocker arm (not shown). The valve driving gear 10a and the cam gear 10b of the valve operating mechanism 10 are accommodated in a valve driving chamber 32. This valve driving chamber 32 is provided on the way of a supply passageway 31 that allows communication between the valve operating chamber 4 formed in the head of the cylinder block 3 and the oil tank 7. Meanwhile, the other parts of the valve operating mechanism 10, such as the rocker arm and so forth, are provided in the valve operating chamber 4.

An oil feeding passageway 34 is provided between the oil tank 7 and the cylinder block 3. An intake part 35 is mounted at the end of the oil feeding passageway 34 in the oil tank 7 side. The intake part 35 has a tubular body 35a which is made of an elastic material such as rubber and is easily flexible, and a weight 35b with an intake port mounted on the tip of the tubular body 35a. This weight 35b in the intake part 35 is mounted to be able to move downward in a vertical direction by gravity. Therefore, even if the oil tank 7 is tilted, it is possible to place the suction port of the intake part 35 below the level of the oil A accumulated within a prescribed amount.

The oil feeding passageway 34 serves to allow communication between the crank chamber 5a and the oil tank 7 to suck up the oil A from the oil tank 7 and supplies the oil A into the crank chamber 5a when the pressure in the crank chamber 5a tends to be a negative pressure because the piston 6 moves upward. An opening 34a of the oil feeding passageway 34 which is open in the crank chamber 5 is positioned such that the opening 34a opens as the piston 6 moves from a position near the top dead center to the top dead center. In other words, the opening 34a is positioned to open when the skirt part 6a which is the lower part of the piston 6 passes over the opening 34a. Therefore, the opening 34a of the oil feeding passageway 34 has already been fully open at the time the piston 6 arrives at the top dead center. Here, when a negative pressure is created in the crank chamber 5a, the oil feeding passageway 34 and the crank chamber 5a may communicate with one another, by, for example, providing a reed valve in the opening 34a of the oil feeding passageway 34, or providing a passageway in the crankshaft to function as a rotary valve.

A check valve 37 is provided on the way of the oil feeding passageway 34. This check valve 37 is configured to open and close in response to pressure fluctuation in the crank chamber 5a. To be more specific, the check valve 37 opens when the pressure in the crank chamber 5a is lower than the pressure in the oil tank 7 to allow the oil feeding passageway 34 to communicate with the crank chamber 5a, and closes when the pressure in the crank chamber 5a is higher than in the oil tank 7. A communicating passageway 56 allows communication between the supply passageway 31 and the oil feeding passageway 34. By this means, when a negative pressure is created in the crank chamber 5a, part of the oil passing through the supply passageway 31 is supplied to the oil feeding passageway 34 to prevent oil from being oversupplied to the supply passageway 31.

A communicating passageway 39 is provided between the bottom of the crank chamber 5a and the oil tank 7 to allow communication between the crank chamber 5a and the oil tank 7. This communicating passageway 39 serves to supply oil mist produced in the crank chamber 5a and oil resulting from liquefying the oil mist, to the oil tank 7. A reed valve 40 is provided in an opening 39a of the communicating passageway 39, which is open in the crank chamber 5a. This reed valve 40 is configured to be able to open and close in response to pressure fluctuation in the crank chamber 5a. To be more specific, the reed valve 40 opens because a positive pressure is created in the crank chamber 5a when the piston 6 moves to the bottom dead center, and therefore allows the communicating passageway 39 to communicate with the crank chamber 5a.

Therefore, when the reed valve 40 opens to allow the communicating passageway 39 to communicate with the crank chamber 5a, the oil mist and the oil in the crank chamber 5a are supplied to the oil tank 7 through the communicating passageway 39.

An opening 39b of the communicating passageway 39 in the oil tank 7 is open in approximately the center in the oil tank 7. This opening 39 is positioned above the level of the oil A accumulated in an amount equal to or smaller than a prescribed amount, even if the oil tank 7 is tilted in every direction. Therefore, the oil mist discharged from the opening 39b of the communicating passageway 39 is returned gently into the oil A in the oil tank 7. By this means, it is possible to return the oil mist to the oil tank 7 gently without agitating the oil in the oil tank 7, and liquefy most of the oil mist. However, part of the oil mist discharged from the opening 39b rebounds from the surface of the oil A or the surface of the wall and remains in the special part in the oil tank 7 above the level of the oil A. In this way, the opening 39b of the communicating passageway 39 placed above the level of the oil A functions as part of a liquefying means. Therefore, most of the oil mist discharged from the communicating passageway 39 is liquefied, and therefore it is possible to reduce the concentration of the oil mist accumulated in the oil tank 7.

The opening 31a of the supply passageway 31 is open in approximately the center of the oil tank 7. This opening 31a is arranged not to be positioned below the level of the oil A even if the oil tank 7 is tilted in every directions and the level of the oil A accumulated within a prescribed amount varies. Moreover, as shown in FIG. 1, the opening 31a of the supply passageway 31 substantially faces a side wall 7b of the oil tank 7 and is open in the side opposite to the communicating passageway 39.

By this means, it is possible to prevent the oil mist discharged from the opening 39b of the communicating passageway 31 from directly entering the opening 31a of the supply passageway 31. More preferably, another exemplary configuration is possible where the communicating passageway 39 and the supply passageway 31 may be arranged such that the distance between the communicating passageway 39 and the supply passageway 31 increases in the direction of the openings. That is, the oil mist discharged from the communicating passageway 39 does not directly enter the opening 31a of the supply passageway 31, as long as the opening 31a of the supply passageway 31 is placed in the base end side of the communicating passageway 39 with respect to the plane of the opening 39b orthogonal to the direction (indicated by a dashed line) in which the communicating passageway 39 extends. That is, with the arrangement of the supply passageway 31 and the communicating passageway 39 in the oil tank 7, it is possible to prevent the oil mist discharged from the communicating passageway 39 from flowing directly into the opening 31a of the supply passageway 31. Therefore, the concentration of the oil mist flowing through the supply passageway 31 is lower than that of the oil supplied from the oil feeding passageway 34 into the crank chamber 5a.

An opening 33a of the supply passageway 31 in the valve operating chamber 4 side opens in the valve operating chamber 4 in the cylinder block 3 side. Therefore, the oil mist flowing through the supply passageway 31 lubricates the valve operating mechanism 10 in the valve driving chamber 32, is discharged from the opening 33a into the valve operating chamber 4, and lubricates the rocker arm and so forth in the valve operating chamber 4.

A push rod passageway 33 allows communication between the valve operating chamber 4 and the valve driving chamber 32. The opening 33a allows communication between the push rod passageway 33 and the valve operating chamber 4. The push rod penetrates the push rod passageway 33 to drive the rocker arm in the valve operating chamber 4. In addition, a protruding wall member 45 is formed in the valve operating chamber 4 to separate oil mist, liquefied oil and so forth from the fluid (oil mist, liquefied oil and blowby gas) flowing from the push rod passageway 33 into the valve operating chamber 4.

A plurality of suction tubes 43 to suck the oil accumulated in the valve operating chamber 4 are provided in the valve operating chamber 4. An opening 43a of each suction tube 43 in the valve operating mechanism 10 side opens in the valve operating chamber 4 in the cylinder block 3 side. Then, the suction tubes 43 are connected to a suction passageway 42. The suction passageway 42 is provided in the valve operating chamber 4 in the opposite side to the crank chamber 5a. The suction tubes 43 are provided in the valve operating chamber 4 to communicate with the suction passageway 42 and extend to the crank chamber 5a side. Both ends of each suction tube 43 are open.

The opening 43a of each suction tube 43 in the cylinder block 3 side is arranged in the position near the bottom surface of the valve operating chamber 4 in the crank chamber 5a side to suck up the oil from the bottom surface of the valve operating chamber 4 in the crank chamber 5a side. Then, the suction tubes 43 are arranged in the corners of the valve operating chamber 4 in order to suck the oil accumulated in the valve operating chamber 4 through any of the suction tubes 43 even if the four-stroke engine 1 is tilted while the valve operating chamber 4 is located in an upper position.

In addition, a plurality of small holes 44 are provided in the suction passageway 42. These small holes 44 are provided on the corner opposite to the suction tubes 43 in the valve operating chamber 4. Therefore, it is possible to suck the oil accumulated in the valve operating chamber 4 through any of the small holes 44 even if the four-stroke engine 1 is tilted upside down to place the valve operating chamber 4 in a lower position. A direct passageway 46 is provided in the suction passageway 42 to allow communication between the valve operating chamber 4 and the crank chamber 5a when a negative pressure is created in the crank chamber 5a.

An opening 246b of the direct passageway 46 is open in the crank chamber 5a. Like the opening 34a of the oil feeding passageway 34, this opening 246b is positioned such that the opening 246b opens as the piston 6 moves from a position near the top dead center to the top dead center. In other words, the opening 246b is positioned to open when the skirt part 6a which is the lower part of the piston 6 passes over the opening 46a. Therefore, the opening 246b of the direct passageway 46 has been fully open at the time the piston 6 arrives at the top dead center. In addition, a check valve may be provided in the direct passageway 46 which allows oil to flow from the valve operating chamber 4 to the crank chamber 5a side and restricts oil from flowing from the crank chamber 5a to the valve operating chamber 4 side. In this way, it is possible to reliably prevent oil or oil mist from flowing backward from the crank chamber 5a to the valve operating chamber 4.

One end 48a of a breather passageway 48 is open in approximately the central part of the valve operating chamber 4, and the other end of the breather passageway 48 is connected to an air cleaner 50. The breather passageway 48 is designed to discharge blowby gas to the combustion chamber. The oil mist and the blowby gas in the valve operating chamber 4 are delivered to the air cleaner 50 via the breather passageway 48 and separated into gas and liquid, that is, separated into blowby gas and oil by an mesh mechanism 51a of an oil separator 51 provided in the air cleaner 50.

The one end 48a of the breather passageway 48 is open in approximately the central part of the valve operating chamber 4, and therefore even if much oil remains in the valve operating chamber 4, does not easily suck the oil. A check valve 41 is provided in the breather passageway 48 to prevent blowby gas and oil mist from flowing backward from the air cleaner 50 to the valve operating chamber 4 side. The oil having been subjected to the gas-liquid separation is supplied to the crank chamber 5a through a reflux passageway 52 that allows communication between the air cleaner 50 and the crank chamber 5a. A check valve 51b is provided in the reflux passageway 52 to allow oil to flow only to the crank chamber 5a side. Meanwhile, the blowby gas having been subjected to the gas-liquid separation is supplied to the combustion chamber. That is, the oil circulation pathway of the lubrication apparatus 100 is formed by the communicating passageway 39, the supply passageway 31, the push rod passageway 33, the suction tubes 43, the small holes 44, the suction passageway 42, the direct passageway 46, the breather passageway 48, and the reflux passageway 52.

When the four-stroke engine 1 is activated, the pressure in the crank chamber 5a changes due to the upward and downward motion of the piston 6. To be more specific, when the piston 6 moves upward, the pressure in the crank chamber 5a decreases and tends to be a negative pressure, and, on the other hand, when the piston 6 moves downward, the pressure in the crank chamber 5a increases and tends to be a positive pressure. As the piston 6 moves to the vicinity of the top dead center because the pressure in the crank chamber 5a tends to be a negative pressure, the opening 34a of the oil feeding passageway 34 starts opening to allow communication between the crank chamber 5a and the oil tank 7. As a result of this, the negative pressure in the crank chamber 5a affects the oil feeding passageway 34.

Even if the four-stroke engine 1 is tilted, the intake part 35 of the oil feeding passageway 34 is positioned below the level of the oil A in the oil tank 7, so that the oil A is sucked from the oil tank 7 and supplied into the crank chamber 5a. At the time the piston 6 arrives at the top dead center, the opening 34a has been fully open, and therefore it is possible to allow the negative pressure in the crank chamber 5a to substantially affect the oil feeding passageway 34. As a result, it is possible to sufficiently supply the oil A pumped up below the level of the oil A into the crank chamber 5a. The oil supplied into the crank chamber 5a lubricates driving parts such as the piston 6 and the crankshaft. At the same time, the oil is scattered from these driving parts and becomes oil mist. Part of the oil mist adheres to the wall surface of the crank chamber 5a and is liquefied again.

When the piston 6 moves downward from the top dead center, the pressure in the crank chamber 5a changes to a positive pressure. Therefore, the reed valve 40 opens to allow communication between the crank chamber 5a and the oil tank 7. Then, the oil mist and the oil in the crank chamber 5a with a positive pressure are supplied to the oil tank 7 via the communicating passageway 39, so that the pressure in the oil tank 7 increases. The oil mist discharged from the communicating passageway 39 collides against the surface of the oil A accumulated in the oil tank 7 and the wall surface of the oil tank 7, and therefore is liquefied and stored in the oil tank 7. The concentration of the oil mist remaining in the oil tank 7, which hit against and rebounded from in the oil tank 7, is lower than in the crank chamber 5a. Here, when a positive pressure is created in the crank chamber 5a, the oil feeding passageway 34 is blocked so as not to prevent the oil from flowing backward from the crank chamber 5a to the oil tank 7 due to the action of the check valve 37. Then, the opening 34a is closed by the piston 6.

An increase in the pressure in the oil tank 7 causes the pressure gradient between the oil tank 7 and the valve operating chamber 4, so that the oil mist accumulated in the oil tank 7 is supplied to the valve operating chamber 4 via the supply passageway 31. In the course of supplying oil mist from the oil tank 7 to the valve operating chamber 4, each part of the valve operating mechanism 10 in the valve driving chamber 32 provided in the supply passageway 31 is lubricated. During this period of time, part of the oil mist is liquefied.

The oil mist supplied to the valve operating chamber 4 lubricates the valve operating mechanism 10 provided in the valve operating chamber 4 and is supplied to the crank chamber 5a via the direct passageway 46. Otherwise, in a case of the oil mist supplied into the valve operating chamber 4 is liquefied and remains in the valve operating chamber 4, it is possible to supply the oil into the crank chamber 5a due to the effect that the level of negative pressure in the crank chamber 5a is high. As a result of this, it is possible to prevent oil from remaining in the valve operating chamber 4. Therefore, it is possible to prevent oil from flowing out when blowby gas is discharged from the valve operating chamber 4 via the breather passageway 48.

A tube 146 is formed of a hose. This tube 146 is flexible, and therefore can be bent. In addition, this tube 146 is made of a heat resisting material which does not deteriorate due to the heat generated by the four-stroke engine 1. An L-shaped pipe line 146a in the cylinder head side is connected to one end of the tube 146 into which oil flows. Meanwhile, an L-shaped pipe line 146b in the cylinder side is connected to the other end of the tube 146 from which oil flows out. The L-shaped pipe line 146a in the cylinder head side is attached, for example, screwed to the opening 246a in the cylinder head side. Meanwhile, the L-shaped pipe line 146b in the cylinder side is attached, for example, screwed to the opening 246b in the cylinder side.

The direct passageway 46 is formed by a passage part penetrating the cylinder head 3a to communicate with the suction passageway 42, the L-shaped pipe 146a, the tube 146, the L-shaped pipe 146b, a passage part penetrating the cylinder block 3 to communicate with the crank chamber 5a.

Figure 2:
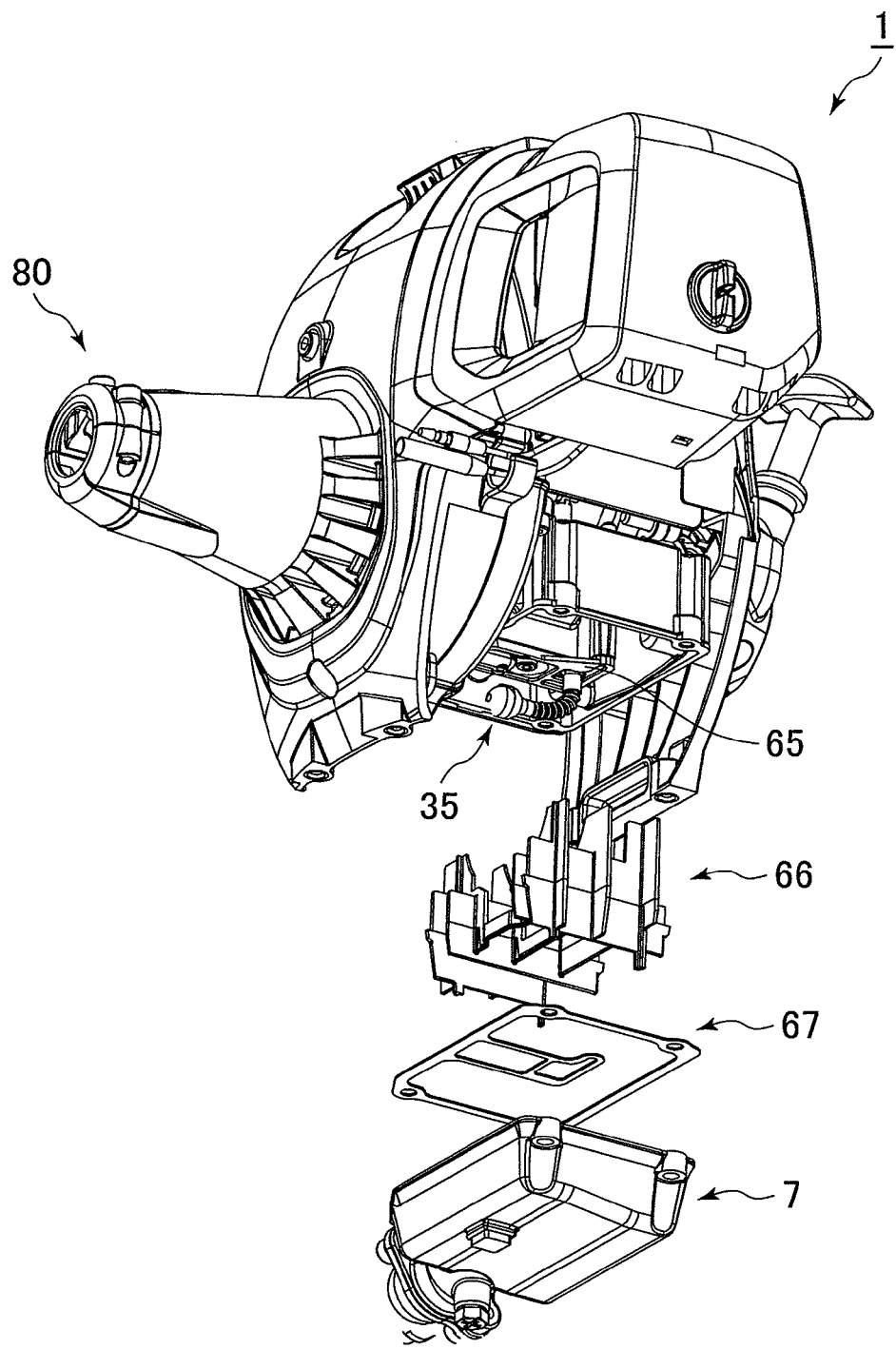
FIG. 2 is an exploded perspective view showing the four-stroke engine equipped with the lubrication apparatus according to the present invention.

FIG. 2 is an exploded perspective view showing the four-stroke engine 1 equipped with the lubrication apparatus 100 according to the present invention. The four-stroke engine 1 includes the oil tank 7, a gasket 67 and a partition 66 in the order from the bottom. Those are combined and coupled to a passageway accommodation part 65 which is provided in the bottom of the upper part of the four-stroke engine 1. The upper part of the four-stroke engine 1 includes a cylinder block 3. The supply passageway 31, the tubular body 35a and the communicating passageway 39 are accommodated in the passageway accommodation part 65. Only the tubular body 35a protrudes downward from the passageway accommodation part 65. The above-described weight 35b with an intake port that is mounted on the tip of the tubular body 35a, is immersed in the oil tank 7.

The lubrication apparatus 100 according to the present invention includes the oil tank 7 and the supply passageway 31 configured to supply oil mist from the oil tank 7. The opening 31a of the supply passageway 31 to supply oil mist is formed in the oil tank 7. The partition 66 is provided between the opening 31a and the side wall 7b of the oil tank 7. The partition 66 divides the inside of the oil tank 7 into an inner area including the opening 31a and an outer area. The outer area is defined between the inner area and the side wall 7b. Here, the partition 66 is formed to allow the oil A to freely move between the inner area and the outer area. Then, the opening 31a is positioned above the level of the oil A accumulated in the oil tank 7 even if the four-stroke engine 1 is tilted in every direction. Here, the outer area may be partitioned into more than one area.

To be more specific, it is preferred that the partition 66 is placed apart from inner walls (top and bottom walls) 7a, of the oil tank 7 in the vertical direction of the partition 66, when the four-stroke engine 1 is in the upright position. In addition, the partition 66 is placed apart from the inner walls (front and back walls) 7a of the oil tank 7 in the longitudinal direction of the partition 66 when the four-stroke engine is 1 in the upright position.

With this configuration, even if the inside of the oil tank 7 is partitioned into a plurality of areas, the oil A in each area of the oil tank 7 always communicates with each other. This prevents the oil A from accumulating in only part of the areas in the oil tank 7.

Figure 3:
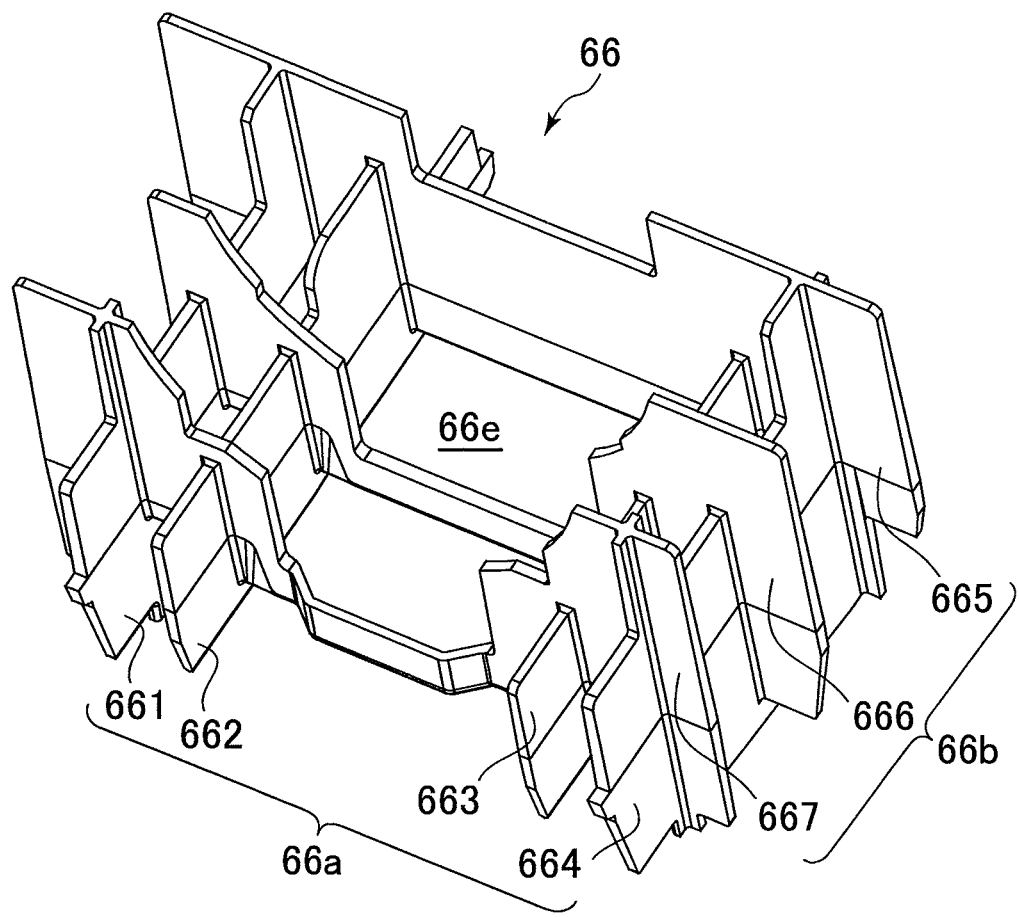
FIG. 3 is a drawing showing a partition according to an embodiment of the present invention, from the cylinder block side.

FIG. 3 is a drawing showing the partition 66 according to an embodiment of the present invention, from the cylinder block side. The partition 66 is formed by partition plate members 66a. In FIG. 3, the partition plate members 66a are shown as four partition plate members 661, 662, 663 and 664. These partition plate members 66a are formed in a double cross with support plate members 66b (665, 666 and 667) which are perpendicular to the partition plate members 66a in the oil tank 7 to partition the inside of the oil tank 7 other than an area 66e around the center.

Here, the number of the partition plate members 66a is not limited to four, and the number and the form may not necessarily be symmetric. In addition, the support plate members 66b may be used as the partition plate members 66a. Moreover, the partition plate members 66a may not necessarily be perpendicular to the support plate members 66b.

This partition 66 allows the oil A to move within each small partitioned area in the oil tank 7. Therefore, it is possible to prevent the oil A from surging even if the oil tank 7 is suddenly tilted or shaken.

FIG. 4A is a front view showing a state where the passageway accommodation part 65 protrudes into the area 66e in the partition 66 while the partition 66 is accommodated in the oil tank 7. FIG. 4B is a cross-sectional view of FIG. 4A taken along line A-A. Here, the passageway accommodation part 65 is omitted from FIG. 5. Here, the term "front side" in the specification will be defined. The four-stroke engine 1 according to the present invention is used for various working machines, such as a brush cutter, a blower and so forth by replacing the working tools corresponding to the machines. Therefore, an attaching portion 80 (see FIG. 2) to detachably attach each working tool is mounted on the four-stroke engine 1. When the four-stroke engine 1 is viewed from the front, there is the attaching portion 80 in the front side.

There is no plate member around the center of the partition 66, which is the area 66e shown in FIG. 3. The passageway accommodation part 65 is inserted into the area 66e.

The supply passageway 31, the tubular body 35a of the intake part 35 and the communicating passageway 39 are accommodated in the passageway accommodating part 65, as described above. It is preferred that the opening 31a of the supply passageway 31 configured to communicate with the valve operating chamber 32 is formed at a position in the vicinity of the center of the oil tank 7. In addition, it is preferred that the level of the oil A accumulated in a prescribed amount is lower than the middle of the oil tank 7.

In this case, the position in the vicinity of the oil tank 7 may be in the area 66e. To be more specific, "the position in the vicinity of the oil tank 7" may be located in the space that is closer to the center of the oil tank 7 than the partition plate member 66a. With this configuration, it is possible to place the opening 31a above the surface of the oil A even if the oil tank 7 is tilted in every direction.

It is preferred that the opening 31a is formed such that the distance between the opening 31a and the surface of the oil A accumulated in the oil tank 7 in a prescribed amount is 3 mm or more even if the four-stroke engine 1 is tilted in every direction.

It is preferred that, among the partition plate members 66a provided between the inner area and the side wall 7a in the oil tank 7, one partition plate member 66a (661 in FIG. 3) that is the closest to the side wall 7b has the smallest distance to each of the top, bottom, front and back walls (7a) of the oil tank 7. When the four-stroke engine 1 is shaken violently, the oil A surges in the vicinity of the side wall 7b rather than the vicinity of the center of the oil tank 7. However, by dividing the inside of the oil tank in the vicinity of the side wall 7a, it is possible to effectively prevent the fluctuation. In particular, it is possible to effectively prevent the surging oil A from reaching the opening 31a by means of the partition plate members 661 and 664 facing the side walls 7b of the oil tank 7.

In addition, the partition plate members 66a are placed apart from the upper and lower walls 7a of the oil tank 7. This arrangement allows the oil A accumulated in the oil tank 7 to freely move. By this means, the oil A is distributed, and therefore it is possible to prevent the oil A from reaching the opening 31a.

Figure 4:
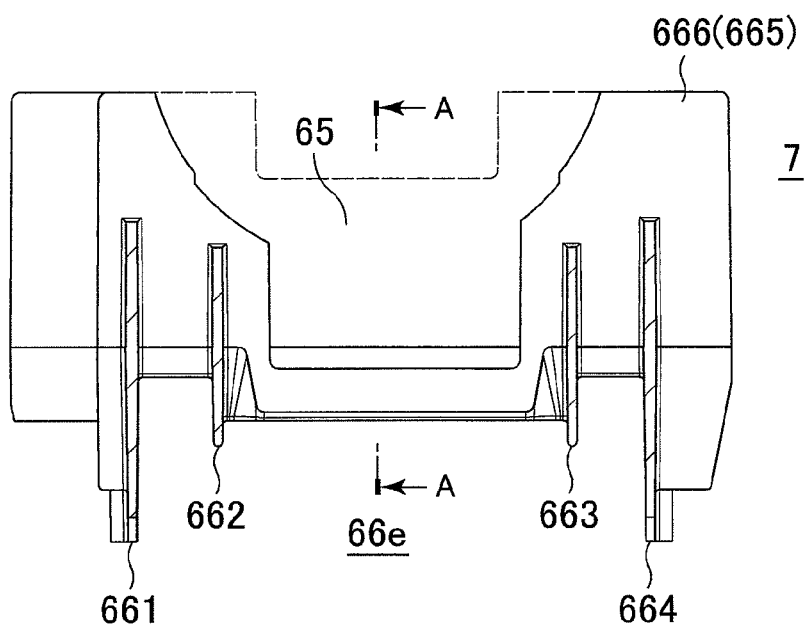
FIG. 4 shows the partition shown in FIG. 3.
Figure 4:
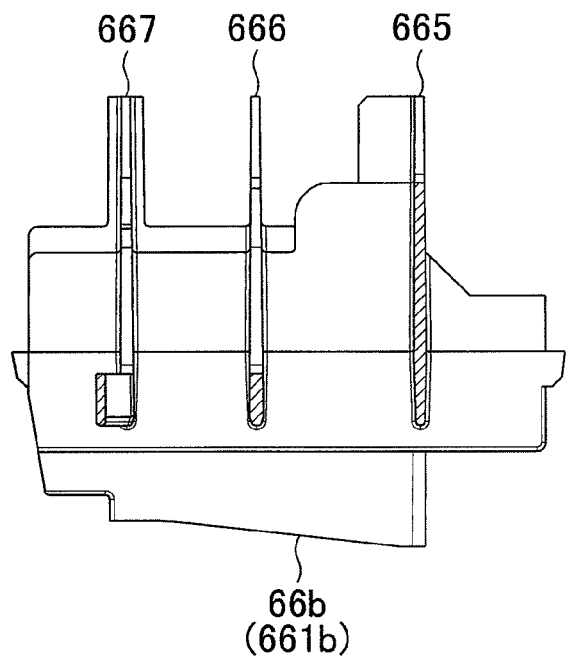
Figure 5:
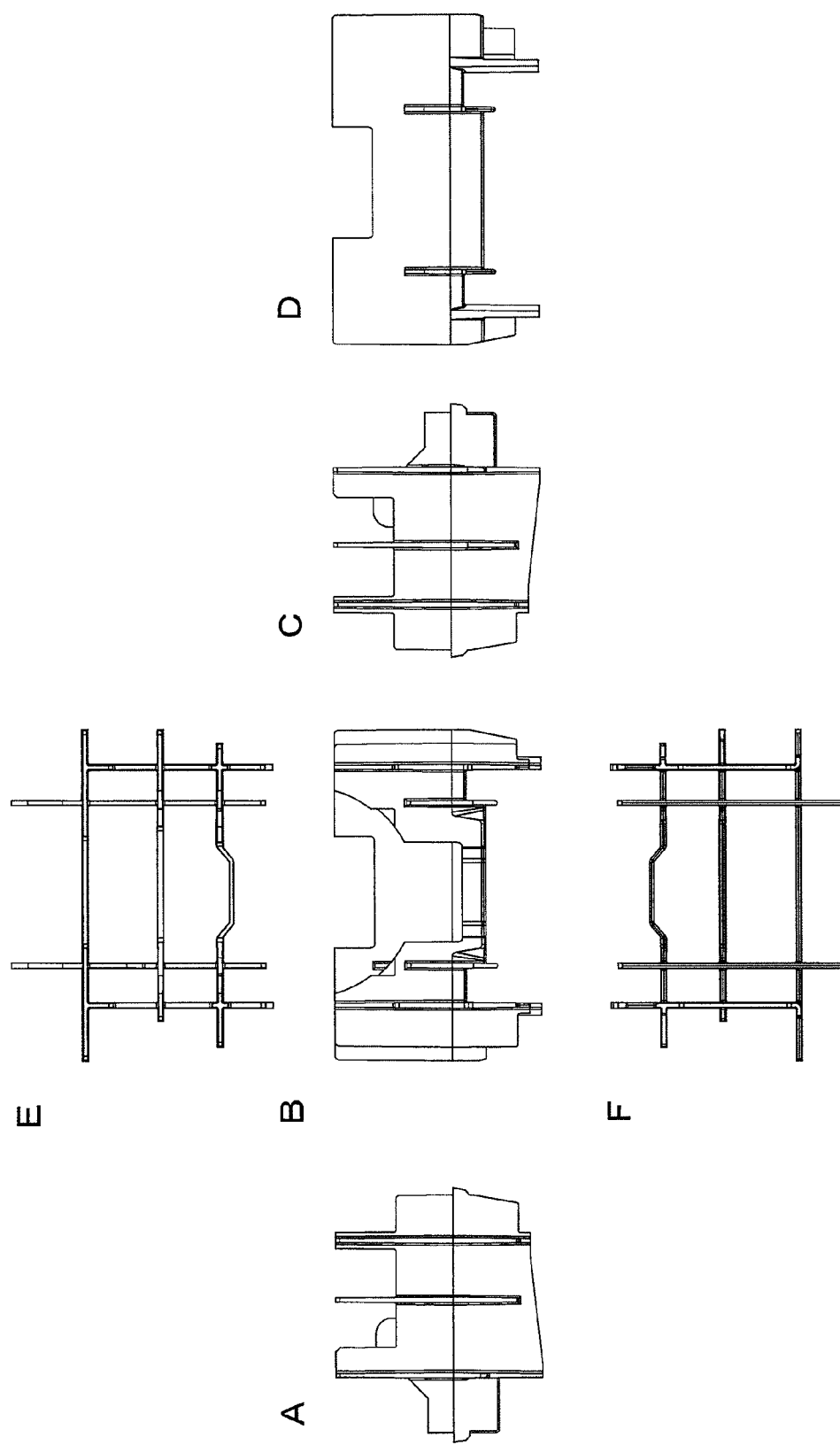
FIG. 5 shows the partition shown in FIG. 3.
Figure 6:
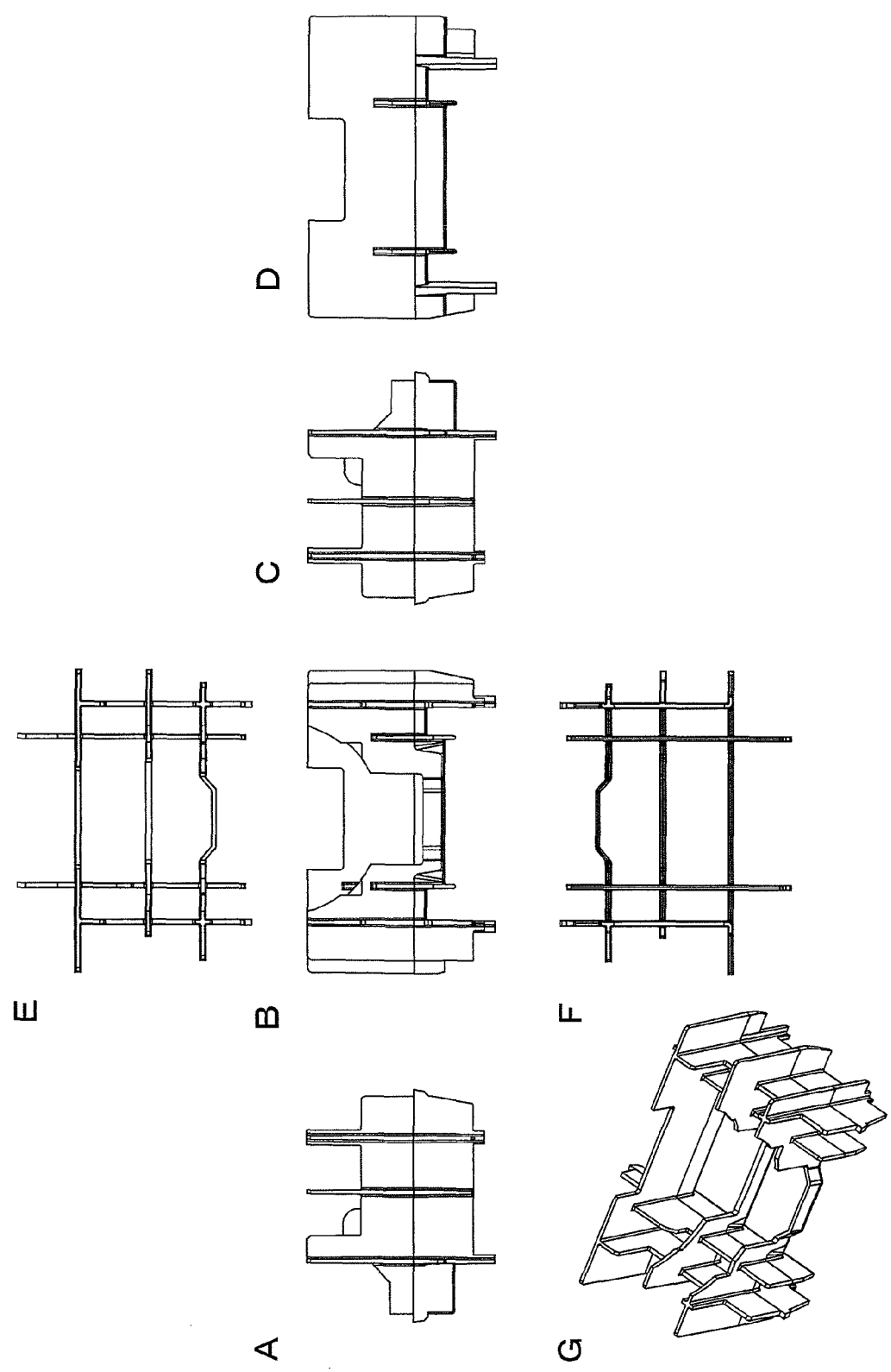
FIG. 6 shows the partition according to another embodiment of the present invention.

FIG. 5 shows the partition 66 shown in FIG. 4 according to an embodiment. FIG. 5A is a left side view, FIG. 5B is a front view, FIG. 5C is a right side view, FIG. 5D is a back view, FIG. 5E is a top view, and FIG. 5F is a bottom view. FIG. 6 shows the partition 66 according to another embodiment. FIG. 6A is a left side view, FIG. 6B is a front view, FIG. 6C is a right side view, FIG. 6D is a back view, FIG. 6E is a top view, and FIG. 6F is a bottom view. In addition, FIG. 6G is a top perspective view.

The partition 66 shown in FIG. 5 differs from the partition 66 shown in FIG. 6 in the form of its bottom. This is clearly shown in FIGS. 5A and 5B, and FIGS. 6A and 6B. As shown in FIG. 5, the bottom of the partition plate member 66a that is the closest to the side wall 7b of the oil tank 7 tilts from the front to the back such that the distance between the back side and the lower wall 7a is smaller than the distance between the front side and the lower wall 7a. By this means, it is possible to prevent the oil A from surging particularly in the back side of the oil tank 7. However, it is by no means limiting. Another configuration is possible where the bottom of the partition plate member 66a that is the closest to the side wall 7b of the oil tank 7 is formed such that the distance between the back side and the lower wall 7a is approximately the same as the distance between the front side and the lower wall 7a. Moreover, further another configuration is possible where the distance between the front side and the lower wall 7a is smaller than the distance between the back side and the lower wall 7a.

Next, the relationship between the volume of the oil tank 7 which is partitioned by the partition 66 and the prescribed amount of the oil A will be explained. Here, the volume of the oil tank 7 excludes the components provided in the oil tank 7.

Figure 7:
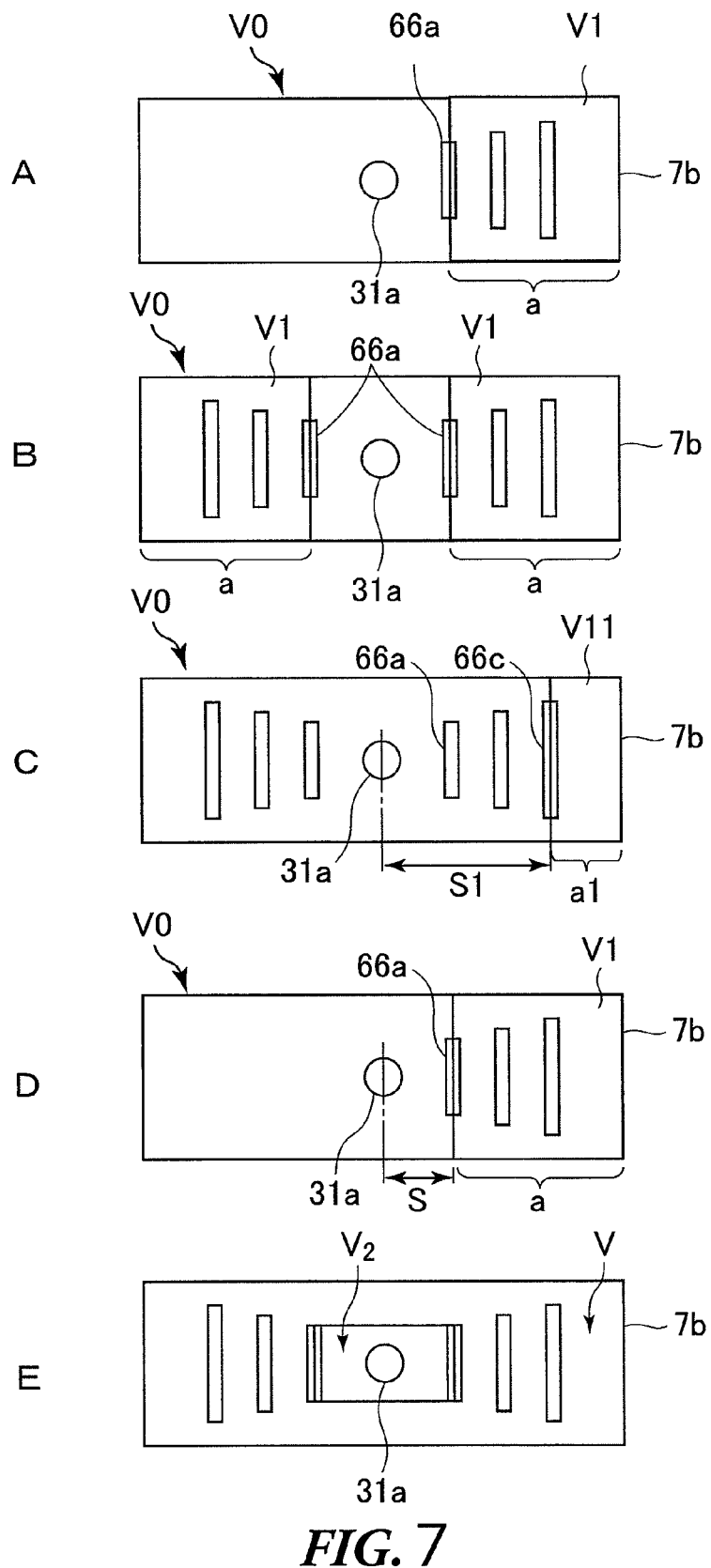
FIG. 7 is a drawing explaining the inner volume of an oil tank partitioned by the partition.

FIG. 7 is a drawing explaining the spacial volume of the oil tank 7 partitioned by the partition 66.

As described above, the inside of the oil tank 7 is partitioned by the partition 66 into the inner area and the outer area. The inner area includes the opening 31a of the supply passageway 31, and the outer area is defined between the inner area and the side wall 7b of the oil tank 7. Here, this inner area has any other partition plate member 66a between the opening 31a and the partition plate member 66a that partitions between the inner area and the outer area. It is possible to prevent oil from reaching the opening 31a even if the four-stroke engine 1a is toppled over sideways, when an equation $V1/V0 \geq 0.1$ is satisfied under the condition that: as shown in FIG. 7A, V1 is the volume of the outer area a defined by the plane including the partition plate member 66a that divides between the inner area including the opening 31a and the outer area, the upper, lower, front and back walls 7a and the side wall 7b; and V0 is the prescribed amount of the oil A accumulated in the oil tank 7. Here, it is possible to prevent oil from reaching the opening 31 when an equation $V1 > V0$ is satisfied, as long as the distance between the surface of the oil A and the opening 31a is sufficiently large. However, the equation $V1/V0 \geq 0.1$ is more preferred. Here, when the equation $V1/V0 \geq 0.1$ is satisfied under the condition that the distance between the opening 31a and the surface of the oil A is 3 mm or more, it is possible to prevent the oil A from reaching the opening 31a even if the four-stroke engine 1 is tilted in every direction. The equation is also satisfied when the partition plate members 66a are located on both sides of the opening 31a as shown in FIG. 7B.

Another configuration is possible where an equation $V11/V0 \geq 0.1$ is satisfied under the condition that: as shown in FIG. 7C, an additional partition plate member 66c is provided between the partition plate member 66a and the side wall 7b; V11 is the volume of the outer area a1 defined by the plane including the additional partition plate member 66c, the upper, lower, front and back walls 7a and the side wall 7b; and V0 is the prescribed amount of the oil A accumulated in the oil tank 7. Also in this case, the distance between the opening 31a and the surface of the oil A should be 3 mm or more even if the four-stroke engine 1 is tilted in every direction. With this configuration, it is possible to prevent the surging oil A from reaching the opening 31a by means of the additional partition plate member 66c. In addition, it is possible to prevent the oil A from surging by means of the plurality of partition plate members 66a and 66c. As described above, when the value of V1/V0 is greater, the effect is improved, and in addition to this, the effect is improved by increasing the distance between the opening 31a and the partition plate member 66a.

Moreover, it is preferred that an equation $S \times V1/V0 \geq 0.3$ mm is satisfied under the condition that: as shown in FIG. 7D, S is the distance between the opening 31a and the partition plate member 66a that divides between the inner area including the opening 31a and the outer area; V1 is the volume of the outer area a defined by the plane including the partition plate member 66a, the upper, lower, front and back walls 7a and the side wall 7b; and V0 is the prescribed amount of the oil A accumulated in the oil tank 7.

Another configuration is possible where an equation $V2/V \geq 0.1$ is satisfied under the condition that: as shown in FIG. 7E, V2 is the volume of the inner area of the oil tank 7 and V is the internal volume of the oil tank 7. With this configuration, the volume of the inner area V2 is sufficiently large, and therefore it is possible to increase the distance between the opening 31a and the surface of the oil A without increasing the oil tank 7 in size.

Moreover, another configuration is possible where an equation $S1 \times V11/V0 \geq 0.3$ mm is satisfied under the condition that: as shown in FIG. 7C, the additional partition plate member 66c is provided between the partition plate member 66a and the side wall 7b; S1 is the distance between the opening 31a and the additional partition plate member 66c; V11 is the volume of the outer area a1 defined by the plane including the additional partition plate member 66c, the upper, lower, front and back walls 7a and the side wall 7b; and V0 is the prescribed amount of the oil A accumulated in the oil tank 7.

When the above-described condition is satisfied, it is possible to prevent the oil A from entering the inner area including the opening 31a, and also it is possible to prevent the oil A from surging by dividing the inner area from the outer area by the partition 66, even if the four-stroke engine 1 is shaken violently. With this configuration, it is possible to prevent the oil A from reaching the opening 31a.

<Configurations and Effects of Embodiments>

The lubrication apparatus 100 for the four-stroke engine 1 according to the present invention includes the oil tank 7 and the supply passageway 31 configured to supply oil mist from the oil tank 7. The opening 31a of the supply passageway 31 is formed in the oil tank 7. The partition 66 is formed between the opening 31a and the side wall 7b of the oil tank 7. The partition 66 divides the inside of the oil tank 7 into the inner area including the opening 31a and the outer area. The outer area is defined between the inner area and the side wall 7b. The partition 66 allows oil to freely move between the inner area and the outer area. The opening 31a is placed in the position in which the opening 31a is above the surface of the oil A accumulated in the oil tank 7 even if the four-stroke engine 1 is tilted in every direction. With this configuration, it is possible to prevent the oil A in the oil tank 7 from surging when the four-stroke engine i is shaken, and therefore produce the effect of preventing an excessive amount of oil from flowing into the valve operating mechanism.

In the lubrication apparatus 100 for the four-stroke engine 1 according to the present invention, the partition 66 is placed apart from the upper and lower wall 7a of the oil tank 7 in the vertical direction of the partition 66, when the four-stroke engine 1 is in the upright position. This configuration allows the oil A in the oil tank 7 to freely move in the oil tank 7.

In addition, in the lubrication apparatus 100 for the four-stroke engine 1 according to the present invention, the partition 66 is placed apart from the front and back walls 7a of the oil tank 7 in the longitudinal direction of the partition 66 when the four-stroke engine 1 is in the upright position. This configuration allows the oil A in the oil tank 7 to freely move in the oil tank 7 in the longitudinal direction of the partition 66.

The lubrication apparatus 100 for the four-stroke engine 1 according to the present invention has the additional partition plate member 66c between the area 66e and the side wall 7b. With this configuration, it is possible to reliably prevent the surging oil A from reaching the opening 31a.

In the lubrication apparatus 100 for the four-stroke engine 1 according to the present invention, the additional partition plate member 66c is the closest to the side wall 7b of the oil tank 7, and has the smallest distance to each of the inner walls (top, bottom, front and back walls) 7a of the oil tank 7, among the partition plate members. With this configuration, it is possible to prevent the surging oil A from reaching the opening 31a.

The lubrication apparatus 100 for the four-stroke engine 100 according to the present invention is formed to have a distance of 3 mm or more between the surface of the oil A accumulated in the oil tank 7 and the opening 31a even if the four-stroke engine 1 is tilted in every direction. With this configuration, it is possible to prevent the surging oil A from reaching the opening 31a.

The lubrication apparatus 100 for the four-stroke engine according to the present invention has a configuration where the equation $V1/V0 \geq 0.1$ is satisfied under the condition that: V1 is the volume of the outer area a defined by the plane including the partition plate member 66a that divides between the inner area including the opening 31a of the supply passageway 31 and the outer area, the upper, lower, front and back walls 7a and the side wall 7b; and V0 is the prescribed amount of the oil accumulated in the oil tank 7. With this configuration, it is possible to prevent the oil A from reaching the opening 31a even if the four-stroke engine 1 is tilted in every direction.

In addition, the lubrication apparatus 100 for the four-stroke engine 1 according to the present invention has a configuration where the equation V11/V0≥0.1 is satisfied under the condition that: the additional partition plate member 66c is provided between the partition plate member 66a and the side wall 7b; V11 is a volume of the outer area a1 defined by the plane including the additional partition plate member 66c, the upper, lower, front and back walls 7a and the side wall 7b; and V0 is the prescribed amount of the oil A accumulated in the oil tank 7. With this configuration, it is possible to prevent the surging oil A from reaching the opening 31a by means of the additional partition plate member 66c. In addition, with the plurality of partition plate members 66a and 66c, it is possible to prevent the oil A from surging.

Moreover, the lubrication apparatus 100 for the four-stroke engine 1 according to the present invention has a configuration where the equation S×V1/V0≥0.3 mm is satisfied under the condition that: S is a distance between the opening 31a and the partition plate member 66a that divides between the inner area including the opening 31a of the supply passageway 31 and the outer area; V1 is the volume of the outer area a defined by the plane including the partition plate member 66a, the upper, lower, front and back walls 7a and the side wall 7b; and V0 is the prescribed amount of the oil accumulated in the oil tank 7. With this configuration, it is possible to produce the effect of preventing an excessive amount of oil from flowing into the valve operating mechanism.

The lubrication apparatus 100 for the four-stroke engine 1 according to the present invention has a configuration where the equation V2/V≥0.1 is satisfied under the condition that: V2 is the volume of the inner area of the oil tank (7), and V is an internal volume of the oil tank (7). With this configuration, the volume of the area 66e (V2) is sufficiently large, and therefore it is possible to increase the distance between the opening 31a and the surface of the oil A without increasing the oil tank 7 in size.

Moreover, the lubrication apparatus 100 for the four-stroke engine 1 according to the present invention has a configuration where the equation S1×/V11/V0≥0.3 mm is satisfied under a condition that: the additional partition plate member 66c is provided between the partition plate member 66a and the side wall 7b; S1 is the distance between the opening 31a and the additional partition plate member 66c; V11 is the volume of the outer area a1 defined by the plane including the additional partition plate member 66c, the upper, lower, front and back walls 7a and the side wall 7b; and V0 is the prescribed amount of the oil accumulated in the oil tank 7. With this configuration, it is possible to produce the effect of preventing an excessive amount of oil from flowing into the valve operating mechanism.

The invention claimed is:

1. A lubrication apparatus for a four-stroke engine comprising:
    an oil tank;
    a supply passageway having an opening to supply oil mist from the oil tank to driving parts, the opening being provided in the oil tank;
    a partition provided between the opening and a side wall of the oil tank and spaced from upper and bottom walls of the oil tank in a vertical direction of the partition, and from front and back walls of the oil tank in a longitudinal direction of the partition, when the four-stroke engine is in an upright position, the partition comprising:
    partition plate members that divide an inside of the oil tank into an inner area and an outer area, the inner area including the opening, and the outer area being defined between the inner area and the side wall;
    an additional partition plate member is provided between the inner area and the side wall of the oil tank; and
    the additional partition plate member is closer to the side wall, and is spaced a smaller distance from each of the top, bottom, front and back walls of the oil tank, than the partition plate members; wherein
    oil can freely move between the inner area and the outer area; and
    the opening is located in a position above a surface of the oil accumulated in the oil tank even when the four-stroke engine is tilted in every direction.

2. The lubrication apparatus for the four-stroke engine according to claim 1, wherein an additional partition plate member is provided between the inner area and the side wall.

3. The lubrication apparatus for the four-stroke engine according to claim 1, wherein the opening is positioned such that a distance between the surface of the oil accumulated in the oil tank and the opening is 3 mm or more.

4. The lubrication apparatus for the four-stroke engine according to claim 3, wherein a relationship V1/V0>0.1 is satisfied, where: V1 is a volume of the outer area defined by a plane including a partition plate member that divides the inner area, including the opening of the supply passageway, and the outer area, upper, lower, front and back walls and the side wall; and V0 is a prescribed amount of the oil accumulated in the oil tank.

5. The lubrication apparatus for a four-stroke engine according to claim 3, wherein a relationship V11/V0>0.1 is satisfied, where V11 is a volume of the outer area defined by a plane including the additional partition plate member, upper, lower, front and back walls and the side wall; and V0 is a prescribed amount of the oil accumulated in the oil tank.

6. The lubrication apparatus for a four-stroke engine according to claim 1, wherein a relationship S×V1/V0>0.3 mm is satisfied, where: S is a distance between the opening and the partition plate member that divides between the inner area, including the opening of the supply passageway and the outer area; V1 is a volume of the outer area defined by a plane including the partition plate member, upper, lower, front and back walls and the side wall; and V0 is a prescribed amount of the oil accumulated in the oil tank.

7. The lubrication apparatus for a four-stroke engine according to claim 6, wherein a relationship V2/V>0.1 is satisfied, where: V2 is a volume of the inner area of the oil tank, and V is an internal volume of the oil tank.

8. The lubrication apparatus for a four-stroke engine according to claim 1, wherein a relationship S1×/V11/V0>0.3 mm is satisfied, where: an additional partition plate member is provided between a partition plate member and the side wall; S1 is a distance between the opening and the additional partition plate member; V11 is a volume of the outer area defined by a plane including the additional partition plate member, upper, lower, front and back walls and the side wall; and V0 is a prescribed amount of the oil accumulated in the oil tank.

9. The lubrication apparatus for a four-stroke engine according to claim 1, further comprising a communicating oil passageway positioned to supply oil and oil mist to the oil tank, an opening of the communicating oil passageway positioned above a level of oil in the oil tank.

10. The lubrication apparatus for a four-stroke engine according to claim 1, further comprising a partition member provided in the oil tank and extending vertically in a plane transverse to the vertical plane in which the partition plate members extend.

11. A lubrication apparatus for a four-stroke engine comprising:
   an oil tank;
   a supply passageway having an opening to supply oil mist from the oil tank to driving parts, the opening being provided in the oil tank;
   a partition provided between the opening and a side wall of the oil tank, the partition comprising partition plate members that divide an inside of the oil tank into an inner area and an outer area, the inner area including the opening, and the outer area being defined between the inner area and the side wall; and
   an additional partition member provided between the inner area and the side wall of the oil tank, the additional partition member is positioned closer to the side wall, and is spaced a smaller distance from each of the top, bottom, front and back walls of the oil tank than the partition plate members, wherein
   oil can freely move between the inner area and the outer area; and the opening is located in a position above the surface of the oil accumulated in the oil tank even when the four stroke engine is tilted in every direction.

12. The lubrication apparatus for the four-stroke engine according to claim 11, wherein the partition is spaced from upper and bottom walls of the oil tank in a vertical direction of the partition, when the four stroke engine is in an upright position.

13. The lubrication apparatus for the four-stroke engine according to claim 11, wherein the opening is positioned such that a distance between the surface of the oil accommodated in the oil tank and the opening is 3 mm or more.

* * * * *

UNITED STATES PATENT AND TRADEMARK OFFICE
CERTIFICATE OF CORRECTION

PATENT NO. : 8,978,614 B2
APPLICATION NO. : 13/668710
DATED : March 17, 2015
INVENTOR(S) : Y. Takahashi et al.

It is certified that error appears in the above-identified patent and that said Letters Patent is hereby corrected as shown below:

Claims
Column 14, line 29 (claim 4, line 2) please change "$VO>$" to -- $VO \geq$ --.
Column 14, line 37 (claim 5, line 2) please change "$VO>$" to -- $VO \geq$ --.
Column 14, line 43 (claim 6, line 2) please change "$VO>$" to -- $VO \geq$ --.
Column 14, line 52 (claim 7, line 2) please change "$V>$" to -- $V \geq$ --.
Column 14, line 57 (claim 8, line 3) please change "$VO>$" to -- $VO \geq$ --.

Signed and Sealed this
Tenth Day of November, 2015

Michelle K. Lee
*Director of the United States Patent and Trademark Office*